(12) United States Patent
Sahu et al.

(10) Patent No.: US 11,321,319 B2
(45) Date of Patent: May 3, 2022

(54) SYSTEM AND METHOD FOR SQL QUERY EXTRACTION IN AN APPLICATION

(71) Applicant: Tata Consultancy Services Limited, Mumbai (IN)

(72) Inventors: Monika Sahu, Pune (IN); Kumar Mansukhlal Vidhani, Pune (IN); Sachin Premsukh Lodha, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 81 days.

(21) Appl. No.: 17/027,309

(22) Filed: Sep. 21, 2020

(65) Prior Publication Data

US 2021/0294803 A1    Sep. 23, 2021

(30) Foreign Application Priority Data

Mar. 20, 2020   (IN) .............................. 202021012197

(51) Int. Cl.
*G06F 16/2453* (2019.01)
*G06F 16/242* (2019.01)
*G06F 16/25* (2019.01)
*G06F 16/901* (2019.01)

(52) U.S. Cl.
CPC .... *G06F 16/24547* (2019.01); *G06F 16/2448* (2019.01); *G06F 16/252* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 2010/0083240 A1* | 4/2010 | Siman ................... | G06F 16/245 717/144 |
| 2010/0287214 A1* | 11/2010 | Narasayya ............ | G06F 16/217 707/805 |
| 2014/0181798 A1 | 6/2014 | Narayanan et al. | |
| 2019/0361686 A1* | 11/2019 | Gnazdowsky ............ | G06F 8/71 |

OTHER PUBLICATIONS

Annamaa, Aivar, et al. "An interactive tool for analyzing embedded SQL queries." Asian Symposium on Programming Languages and Systems. Springer, Berlin, Heidelberg, 2010. pp. 131-138. (Year: 2010).*

(Continued)

*Primary Examiner* — Tony Mahmoudi
*Assistant Examiner* — Umar Mian
(74) *Attorney, Agent, or Firm* — Finnegan, Henderson, Farabow, Garrett & Dunner LLP (57) ABSTRACT

This disclosure relates generally to a method and system for extraction of SQL queries in an application. Various conventional approaches models SQL query extraction at a specific program point problem as an instance of string expression problem. Many string analysis based solutions are not scalable for large applications and those which are scalable do not account explicitly for the heap based flow. In an embodiment, the disclosed method and system utilizes a multi-criteria slicing based model which takes into account the data flowing through heap and contributing to SQL queries generation.

13 Claims, 3 Drawing Sheets

(56) References Cited

OTHER PUBLICATIONS

Krinke, Jens. "Evaluating context-sensitive slicing and chopping." International Conference on Software Maintenance, 2002. Proceedings.. IEEE, 2002., pp. 22-31. (Year: 2002).*

Zhang, Yingzhou. "SymPas: Symbolic Program Slicing." Published on Mar. 13, 2019 by arXiv.org. Accessed on Jan. 20, 2022 from https://arxiv.org/abs/1903.05333 (Year: 2019).*

Maule, Andy et al., "Impact Analysis of Database Schema Changes", International Conference on Software Engineering, 2008, IEEE, http://www0.cs.ucl.ac.uk/staff/w.emmerich/publications/ICSE2008/schemaChangeICSE08/icse08.pdf.

Dasgupta, Arjun et al., "A Static Analysis Framework for Database Applications", International Conference on Data Engineering, 2009, IEEE, https://www.researchgate.net/publication/220966408_A_Static_Analysis_Framework_for_Database_Applications/link/568cf83f08aeb488ea321bd2/download.

Halder, Raju et al., "Abstract Program Slicing of Database Query Languages", Computer Science, 2013, SAC, https://www.dsi.unive.it/~cortesi/paperi/SAC2013.pdf.

* cited by examiner

FIG. 3

SYSTEM AND METHOD FOR SQL QUERY EXTRACTION IN AN APPLICATION

PRIORITY CLAIM

This U.S. patent application claims priority under 35 U.S.C. § 119 to: India Application No. 202021012197, filed on Mar. 20, 2020. The entire contents of the aforementioned application are incorporated herein by reference.

TECHNICAL FIELD

The disclosure herein generally relates to structured query language (SQL) query extraction, and, more particularly, to system and method for SQL queries extraction in an application.

BACKGROUND

Extraction of embedded SQL queries in an application can play important role in handling different scenarios such as database changes, queries modification, application restructuring, system migration, and so on. There are program analysis based approaches which model SQL query extraction at a specific program point problem as an instance of string expression problem. Many string analysis based solutions are not scalable for large applications and those which are scalable do not account explicitly for the heap based flow.

SUMMARY

Embodiments of the present disclosure present technological improvements as solutions to one or more of the above-mentioned technical problems recognized by the inventors in conventional systems. For example, in one embodiment, a method for extracting structured query language (SQL) query in an application is provided. The method includes obtaining, via one or more hardware processors, a System Dependence Graph (SDG) of the application and a slicing criterion associated with a SQL hotspot, the SQL hotspot comprising a program point in the application for dispatching the SQL query to a database associated with the application. Further, the method includes extracting, via the one or more hardware processors, one or more query generation nodes of the SQL query from the application. Moreover, the method includes computing, based on the slicing criterion, a main backward slice for the SQL hotspot using a backward slicing model, via the one or more hardware processors. Also, the method includes computing, via the one or more hardware processors, one or more backward slices on the main backward slice extracted for the SQL hotspot by using each of the one or more query generation nodes as new slicing criterion. Also, the method includes processing, via the one or more hardware processors, each of the one or more backward slices corresponding to the one or more query generation nodes to extract one or more SQL queries, wherein processing comprises classifying one or more edges associated with the one or more backward slices in the SDG and propagating values of one or more constant variables in the application along the one or more edges. Finally, the method includes checking, via the one or more hardware processors, each of the one or more SQL queries for syntactic validity by using a SQL parser.

In another aspect, a system for extracting SQL query in an application is provided. The system includes one or more memories; and one or more hardware processors, the one or more memories coupled to the one or more hardware processors, wherein the one or more hardware processors are configured to execute programmed instructions stored in the one or more memories, to obtain a System Dependence Graph (SDG) of the application and a slicing criterion associated with a SQL hotspot, the SQL hotspot comprising a program point in the application for dispatching the SQL query to a database associated with the application. Further, the one or more hardware processors are configured by the instructions to extract one or more query generation nodes of the SQL query from the application. Furthermore, the one or more hardware processors are configured by the instructions to compute, based on the slicing criterion, a main backward slice for the SQL hotspot using a backward slicing model. Moreover, the one or more hardware processors are configured by the instructions to compute one or more backward slices on the main backward slice extracted for the SQL hotspot by using each of the one or more query generation nodes as new slicing criterion. Also, the one or more hardware processors are configured by the instructions to process each of the one or more backward slices corresponding to the one or more query generation nodes to extract one or more SQL queries, wherein processing comprises classifying one or more edges associated with the one or more backward slices in the SDG and propagating values of one or more constant variables in the application along the one or more edges. Also, the one or more hardware processors are configured by the instructions to check each of the one or more SQL queries for syntactic validity by using a SQL parser.

In yet another aspect, a non-transitory computer readable medium for a method for extracting SQL query in an application is provided. In one embodiment, the method for extracting SQL query includes obtaining, via one or more hardware processors, a System Dependence Graph (SDG) of the application and a slicing criterion associated with a SQL hotspot, the SQL hotspot comprising a program point in the application for dispatching the SQL query to a database associated with the application. Further, the method includes extracting, via the one or more hardware processors, one or more query generation nodes of the SQL query from the application. Moreover, the method includes computing, based on the slicing criterion, a main backward slice for the SQL hotspot using a backward slicing model, via the one or more hardware processors. Also, the method includes computing, via the one or more hardware processors, one or more backward slices on the main backward slice extracted for the SQL hotspot by using each of the one or more query generation nodes as new slicing criterion. Also, the method includes processing, via the one or more hardware processors, each of the one or more backward slices corresponding to the one or more query generation nodes to extract one or more SQL queries, wherein processing comprises classifying one or more edges associated with the one or more backward slices in the SDG and propagating values of one or more constant variables in the application along the one or more edges. Finally, the method includes checking, via the one or more hardware processors, each of the one or more SQL queries for syntactic validity by using a SQL parser.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 illustrates an exemplary system for extraction of SQL queries in an application according to some embodiments of the present disclosure.

FIG. 2 is a flow diagram illustrating a method for extraction of SQL queries in accordance with some embodiments of the present disclosure.

FIG. 3 is an illustrative representation of a System Dependence Graph (SDG) for an application to an example embodiment of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Applications interact with database through SQL queries. During the evolution of an application, if applications' database undergoes changes, corresponding SQL queries have to be changed as well. Therefore, analysis of SQL queries can be of great value to handle the application evolution. An example of SQL queries analysis could be an extraction of all SQL queries at generation points embedded in the given application.

A popular way to handle SQL queries in, for example, Java™ based applications is to analyze the string expressions. There is a huge diversity in approaches proposed to analyze string expressions. Examples of such approaches includes but are not limited to automata based, Abstract Interpretation based, Symbolic execution based, slicing based and constraints based. However, many such approaches do not account for string analysis which includes heap-based data flows. Moreover, the conventional approaches are either expensive or infeasible for big applications. For example, automata-based solutions are precise but computationally expensive and do not scale up. To increase the precision and efficiency of Abstract Interpretation based string analysis solution, one could possibly have to deal with many abstract domains. Symbolic execution-based approaches are not scalable for large Java™ programs. String Analyzer (JSA) and Violist are string analysis solutions for Java™. JSA models string operations in a flow insensitive manner through context free grammar rules. It then approximates those rules through regular language using Mohri-Nederhof algorithm. Violist models all the string operations supported by JSA. Moreover, it supports the context and flow sensitivities, a substantial improvement over JSA. Violist and JSA focus exclusively on the strings and do not account for a string analysis which includes heap-based data flow.

Many a times, a SQL query is constructed by reading data from the instances of user defined objects in applications developed using object-oriented languages like Java™. Therefore, a solution to extract SQL queries generation points should account for the heap-based flow. Another challenge in the SQL query extraction is to account for all possible generation points that could be generated at a given hotspot in application (SQL hotspot is a method in application which dispatches a query to the database). For example, as shown in the Listing 1, one of two SQL queries could be executed at line number 17 depending on the path taken at runtime. An obvious solution is to enumerate all paths to extract all queries. This could be very expensive and infeasible for big applications.

The code shown in the Listing 1 creates two Employee objects (at line numbers 4 and 5) and initialize them with concrete values. It should be noted that other fields of Employee class are ignored and the main focus is solely on the firstname field. Depending on the value returned by getFlagVal function (at line number 7), either of two queries (at line numbers 10 and 13 respectively) are executed at the SQL hotspot (line number 17). Another important point to observe is the SQL queries generated fetch the value of firstname field from different Employee instances.

Multiple values may be returned from a function in real-world application (instead of one as shown in the Listing 1 at line 10) leading to different SQL queries at a given generation point.

Listing 1: Example

```
1
2   main ( )
3   {
4     Employee e1 = new Employee ( " John " , . . ) ;
5     Employee e2 = new Employee ( " Steve " , . . ) ;
6   . .
7     boolean flag = getFlagVal ( ) ;
8   . .
9     if (flag)
10      query = " SELECT * FROM EMPLOYEE where firstname = "
11      + e1 . getName ( ) ;
12    Else
13      query = " SELECT * FROM EMPLOYEE where firstname = "
14      + e2 . getName ( ) ;
15
16    Statement s = conn.getstatement ( ) ;
17    s.executeQuery (query) ;
18  }
19  public Employee ( String fname , . . )
20  {
21    this . firstname = fname ;
22  . .
23  }
24  public String getName ( )
25  {
26    return firstname ;
27  }
```

Various embodiments disclose methods and systems for extracting of SQL queries in a computationally inexpensive manner. For example, in an embodiment the disclosed method includes statically extracting SQL queries at generation points for the application using a multi-criteria slicing model. Herein, the term 'model' may refer to algorithms for methods or procedures that facilitate performance of a task. Said model may further facilitate computations associated with the methods and procedures. Accordingly, the term 'model' and 'algorithm' may be used interchangeably throughout the description. In an embodiment, the disclosed method takes into account heap-based data flow. In an embodiment, the disclosed system computes a backward slice for the SQL hotspots given as input. During computation of the backward slice, the system also extracts new slicing criterion, one for each possibly new and different SQL query generation points and subsequently computes a backward slice for each such criterion. Each backward slice is then translated into a SQL query while taking into account the heap-based data flow. In various embodiments, it is assumed that a SQL query extracted at given SQL generation point is a representative of other possible queries that could be generated either statically or dynamically, as will be described and illustrated in the description below.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
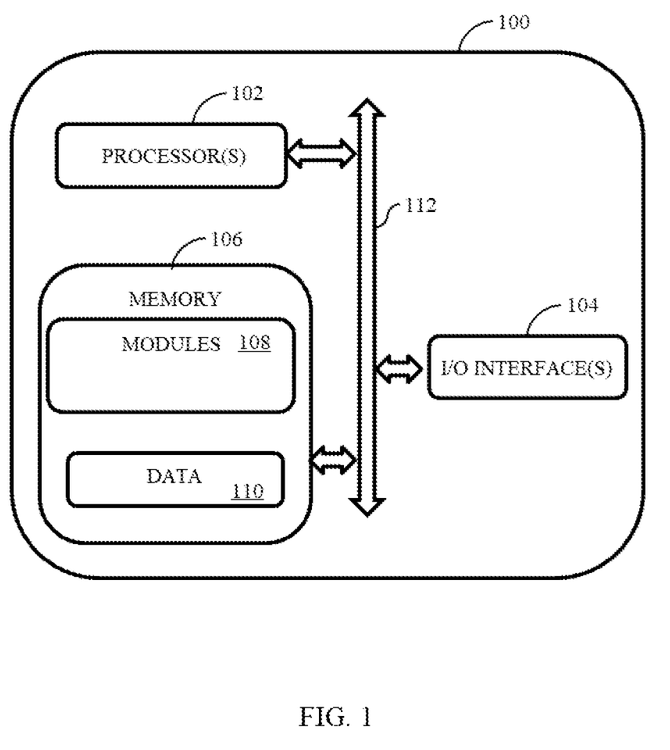
Figure 2:
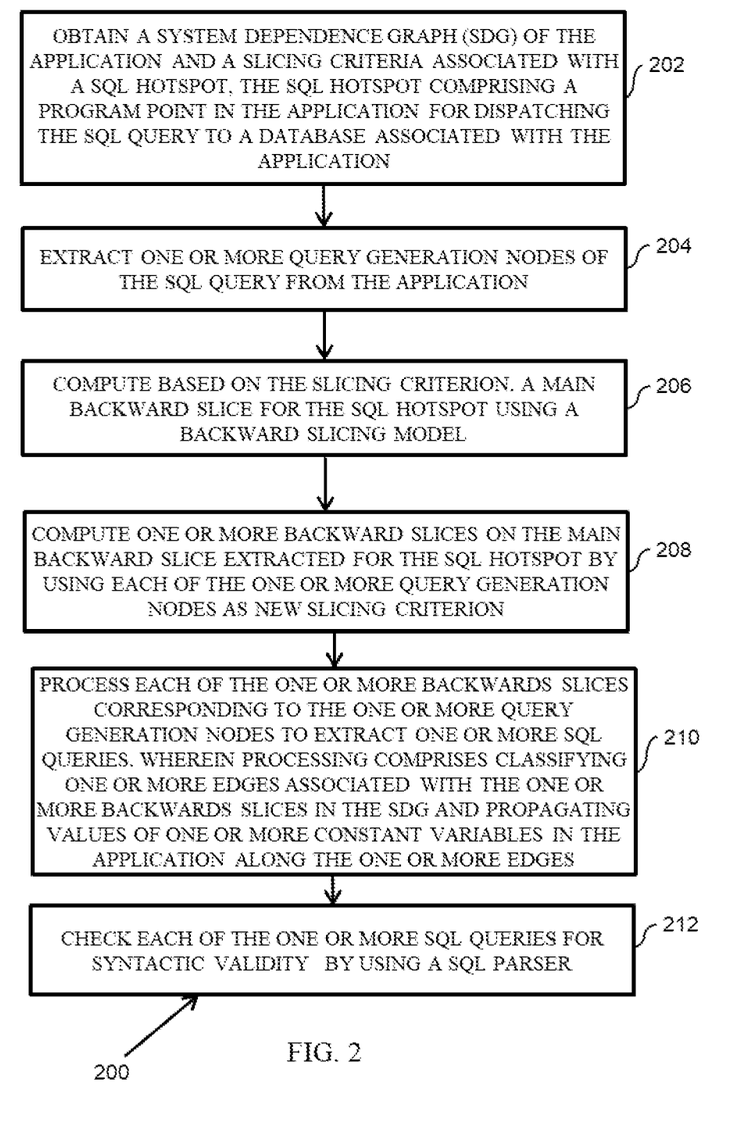
Figure 3:
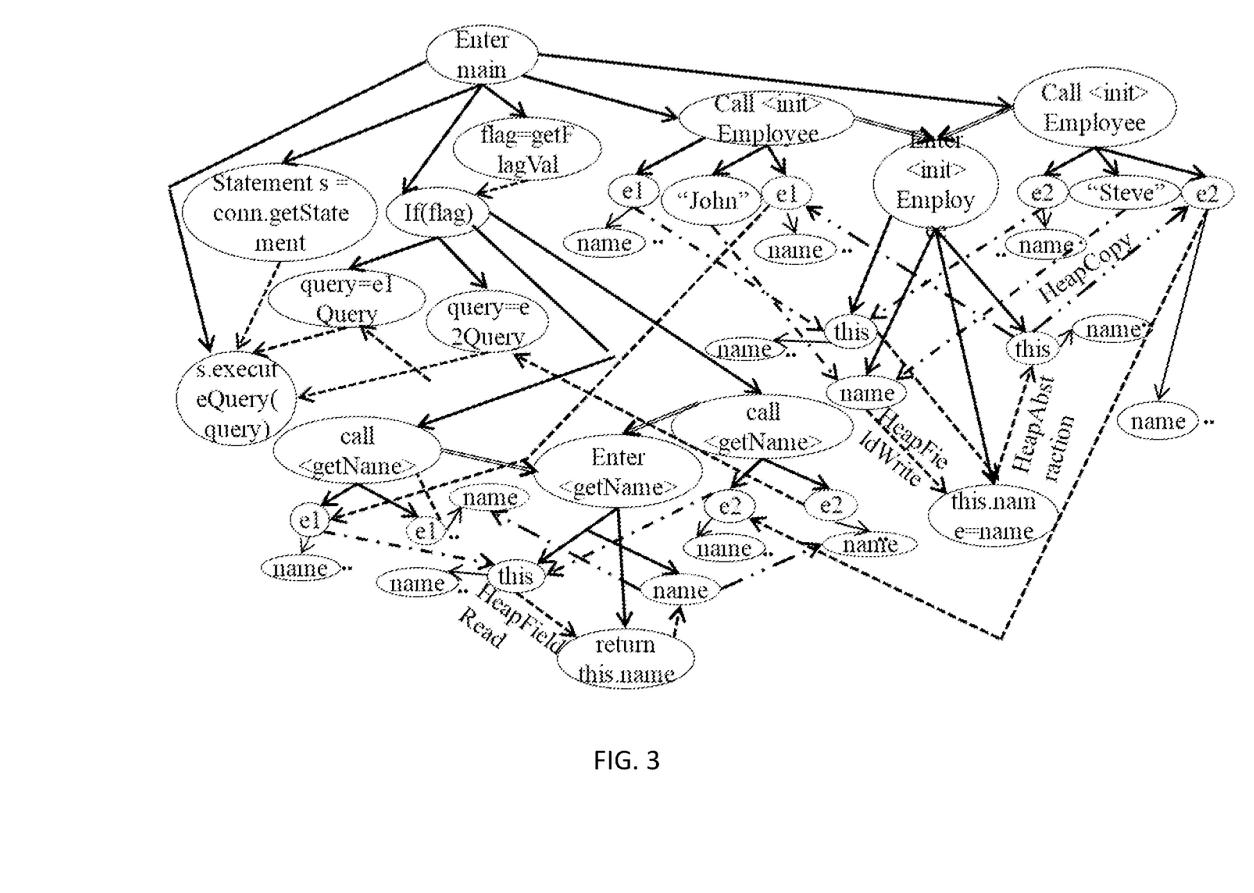

Referring now to the drawings, and more particularly to FIG. 1 through 3, where similar reference characters denote corresponding features consistently throughout the figures, there are shown preferred embodiments and these embodiments are described in the context of the following exemplary system and/or method.

FIG. 1 illustrates a block diagram of a system 100 implementing extracting of SQL queries in an application, in accordance with an implementation of the present subject matter. The system 100 may be implemented in a computing device. Examples of the computing device include, but are not limited to, mainframe computers, workstations, personal computers, desktop computers, minicomputers, servers, multiprocessor systems, laptops, a cellular communicating device, such as a personal digital assistant, a smart phone, and a mobile phone; and the like. The system 100, implemented using the computing device, includes one or more hardware processor(s) 102, IO interface(s) 104, and a memory 106 coupled to the processor 102. The processor 102 can be a single processing unit or a number of units. The hardware processor 102, the memory 106, and the IO interface 104 may be coupled by a system bus such as a system bus 112 or a similar mechanism. The processor 102 may be implemented as one or more microprocessors, microcomputers, microcontrollers, digital signal processors, central processing units, state machines, logic circuitries, and/or any devices that manipulate signals based on operational instructions. Among other capabilities, the processor 102 is configured to fetch and execute computer-readable instructions and data stored in the memory 106.

Functions of the various elements shown in the figures, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or customized, may also be included.

The IO interfaces 104 may include a variety of software and hardware interfaces, for example, interface for peripheral device(s), such as a keyboard, a mouse, an external memory, and a printer. Further, the IO interfaces 104 may enable the computing device to communicate with other computing devices, such as a personal computer, a laptop, and like.

The memory 106 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 106 may also include module(s) 108 and data 110.

The modules 108 may include routines, programs, objects, components, data structures, and so on, which perform particular tasks or implement particular abstract data types. The modules 108 may include programs or computer-readable instructions or coded instructions that supplement applications or functions performed by the system 100. The modules 108 may also be used as, signal processor(s), state machine(s), logic circuitries, and/or any other device or component that manipulates signals based on operational instructions. Further, the modules 108 can be used by hardware, by computer-readable instructions executed by the one or more hardware processors 102, or by a combination thereof. In an embodiment, the modules 108 can include various sub-modules and other module(s). The other module(s) may include programs or coded instructions that supplement applications and functions of the computing device.

The data 110, amongst other things, serves as a repository for storing data processed, received, and generated by one or more of the module(s) 108. The data 110 includes, for example, SQL query extraction data associated with strategies and techniques, and other data. The other data includes data generated as a result of the execution of one or more modules in the other module(s).

According to an implementation of the present subject matter, systems and methods for SQL queries extraction in an application is described. The disclosed system may be incorporated in a computing device. The computing devices include, but are not limited to, desktop computers, hand-held devices, laptops or other portable computers, and the like.

In one implementation, the SQL queries may be extracted by extracting the SQL queries at a specific program point as an instance of string expression problem. The disclosed system implements a multi-criteria slicing based approach which takes into account the data flowing through heap and contributing to SQL queries generation. A detailed flow diagram of a method for SQL queries extraction in an application is illustrated and explained in FIG. 2.

FIG. 2 illustrates an example flow diagram of a method 200 for SQL queries extraction in an application in accordance with embodiments of the present disclosure. The method 200 depicted in the flow chart may be executed by a system, for example, the system, 100 of FIG. 1. In an example embodiment, the system 100 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 200 are described with help of system 100. However, the operations of the method 200 can be described and/or practiced by using any other system.

At 202, the method 200 includes obtaining a System Dependence Graph (SDG) of the application and a slicing criterion associated with a SQL hotspot. The SQL hotspot includes a program point in the application for dispatching the SQL query to a database associated with the application. The SDG is representative of the application and is configured by combining multiple Program Dependence Graphs (PDGs) associated with multiple methods in the application. The configuration of SDG and PDG is described in detail with reference to FIG. 3 below.

A PDG is an important graph data structure that consists of a plurality of PDG nodes and edges between them. Typically, PDG nodes are the program statements of Intermediate Representation (IR) of a method and their structure depends on the choice of IR and program analysis framework. There are two types of PDG edges between PDG nodes: control edge and data edge. A control edge between two PDG nodes indicates control dependency. As shown in FIG. 3, there are control edges shown as dark solid arrows between if(flag) node and two SQL queries creation nodes, query=e1Query and query=e2Query. A data edge between two nodes indicates the data dependency. Typically, the data dependency is created using def-use (or definition-use) chains between two PDG nodes. A Definition-Use chain consists of all definitions/uses of a variable, according to the sequence of their appearance in the source code. There are three data edges (shown as solid dot edges) incident on the SQL hotspot node (s.executeQuery(query)), one from the statement object creation node Statement s=conn.getStatement( ) and two from SQL queries creation nodes query=e1Query and query=e2Query.

PDG graph data structure represents a single method of an application. To represent the entire application, PDG for each method of application should be created and subsequently connected to other PDGs. A resulting graph structure after connecting all PDGs is called SDG for a given application. Two PDGs are connected through a call edge that captures method invocation semantics of a programming language. By default, each PDG has two special nodes: entry and exit. There is a call edge from a callsite node of calling method PDG to an entry node of called method PDG. As shown in FIG. 3, there are call edges (depicted as double line arrow) between call-getName nodes and Enter-getName node. The parameters passed from a caller PDG to a callee PDG are captured through parameter-in edges (shown as line single dot edges). Parameters modified by the called method and visible outside its scope including return values to calling methods are captured through parameter-out edges (shown as line double dot edges). Summary edge captures transitive dependencies arising due to method call between the actual-in parameters and the actual-out parameters. SDG of an application is inherently both context and flow sensitive due to its structure.

Herein it will be noted that the disclosed method takes into account heap based data flow contributing to SQL query generation. As is understood, Java™ creates instances of reference type (Java class) on heap. An instance of class is visible (e.g., an update to a field of an instance) across all methods of class. There is no provision in SDG to account for such a case. Moreover, it is important to understand how the language semantics such as parameters passing plays a role while constructing the SDG. In Java™, the parameters of primitive types are passed as call-by-value and the parameters of reference types are passed as call-by-reference excluding the parameters of String type which are treated as primitive.

In an embodiment of present disclosure, heap objects are modeled in order to integrate heap-based data flow into SDG. In an embodiment, the heap object is passed as a parameter in form of tree. The tree represents object itself and children in the tree represents data members. The leaves of the tree are primitive type data members. Since two different instances of a class may be represented by different trees, it may result into more fine-grained SDG. Therefore, the disclosed method improves the precision of a slice computed over the SDG. The limitation of this model is the handling of nested object, an object containing reference to another object or itself. Accordingly, in an example scenario, a k-limiting strategy may be implemented to limit the depth of tree to kth level. In the present embodiment, the receiver object is also passed in form of tree at a callsite.

Upon obtaining the PDGs and the SDG of the application, the disclosed method executes a multi-criteria backward slicing algorithm with SQL hotspot (a program point in the application which dispatches the query to database, for example, a method executeQuery from the java.sql.Statement class) and collects the query generation nodes. Each query generation node is further used as a slicing criterion to compute backward slice on the slice extracted for the SQL hotspot. The slice corresponding to the query generation node is further processed to extract the SQL query. Edges in the slice are classified and values are propagated along those edges. Finally, each extracted SQL query is checked for its syntactic validity.

At 204, the method 200 includes extracting one or more query generation nodes of the SQL query from the application. Extraction of one or more query generation nodes of the SQL query is described with reference to Listing 1. As shown in Listing 1, there is a possibility of two different SQL queries executed at line number 17 depending on the value of the flag variable. To account for both the queries, simply taking a backward slice at SQL hotspot (line number 17) may not yield the desired result. The backward slice on the SDG for the SQL hotspot (line number 17) fetches almost entire SDG (excluding nodes corresponding to lines 6, 8, 22). The backward slice is computed with respect to SQL hotspot at 206, and is referred to as MainSlice.

To extract both SQL queries, the SQL query generation nodes/points in the program (line numbers 10-11 and 13-14) should be further analyzed within MainSlice. The disclosed method treats such generation points as new criterion for (new) backward slices to be computed on the MainSlice. At 208, the disclosed method computes one or more backward slices on the main backward slice extracted for the SQL hotspot by using each of the one or more query generation nodes as new slicing criterion. By computing the backward slices within MainSlice, the disclosed method segregates the portions of a program contributing to individual SQL queries generation and also the computation of slice becomes efficient. For example, the backward slice for the first query (lines 10-11) includes SDG nodes corresponding to lines of (10-11, 9, 7, 4, 21, 26). Similarly, the backward slice for the second query (lines 13-14) includes SDG nodes corresponding to lines of (13-14, 9, 7, 5, 21, 26). The multi-criteria backward slicing model is described further with reference to Algorithms 1 and 2.

| | | Algorithm 1: Function computeMultiCriteriaMultipleBackwardSlices(SDG, CL) | |
|---|---|---|---|
| SDG | | : System Dependence Graph of an application | |
| CL | | : A Set of Slicing Criterion for SQL Hotspot | |
| | a) | MainSlice = empty | -- Backward Slice for SQL hotspot |
| | b) | Slices = empty | -- Slice within MainSlice for individual SQL query generation |
| | c) | S | -- Slice computed for each slicing criterion |
| | d) | worklist_up | -- Marked node to process during first pass |
| | e) | worklist_down | -- Marked node to process during second pass |
| | f) | PARAMETER_IN | -- Edge type as described in paragraph [032] |
| | g) | PARAMETER_OUT | -- Edge type as described in paragraph [032] |
| | h) | METHOD_CALL | -- Edge type is call edge as described in paragraph [032] |
| | i) | String Generation Node | -- method invoked on Java string API |
| 1. | while Criteria List, CL is not empty do { | | -- compute multi criteria multiple backward slices for each SQL hotspot |
| 2. | sliceCriterion = a slicing criterion from CL | | |
| 3. | S = empty | | |
| 4. | S.add(sliceCriterion) | | -- put the sliceCriterion into S and |
| 5. | worklist_up.add(sliceCriterion) | worklist_up | |
| 6. | worklist_down = empty | | |
| 7. | while worklist_up is not empty do { | | -- First Pass: Slicing without descending into called functions |
| 8. | worklist_up.remove(n) | | -- remove a node n from worklist_up |
| 9. | edgeList = SDG.getTargetEdges(n) | | -- get all edges as target edges from SDG |
| 10. | for each edge in edgeList do { | | |
| 11. | if edge source node, m not exist in S then | | |
| 12. | if edge type is PARAMETER_OUT then | | |
| 13. | S.add(m) | | -- put the source node m into S and |
| 14. | worklist_down.add(m) | worklist_down | |
| 15. | else | | |
| 16. | S.add(m) | | |
| 17. | worklist_up.add(m) | | |
| 18. | if m is String Generation Node then | | |
| 19. | CL.add(m) | | -- put m as string generation criterion to CL |
| 20. | } | | |
| 21. | } | | |
| 22. | while worklist_down is not empty do { | | -- Second Pass: Slice called function without ascending to call sites |
| 23. | worklist_down.remove(n) | | -- remove a node n from worklist_up |
| 24. | edgeList = SDG.getTargetEdges(n) | | -- get all edges as target edges from SDG |
| 25. | for each edge in edgeList do { | | |
| 26. | if edge source node, m not exist in S then | | |
| 27. | if edge type is PARAMETER_IN or METHOD_CALL then | | |
| 28. | S.add(m) | | |
| 29. | worklist_down.add(m) | | |
| 30. | } | | |
| 31. | } | | |
| 32. | /* First and Second Pass Completed /* | | |
| 33. | If MainSlice is empty then | | |
| 34. | MainSlice = S | | -- assignment of S to MainSlice |
| 35. | SDG = MainSlice | | |
| 36. | Slices.add(S) | | -- put S into Slices |
| 37. | } | | |
| 38. | return (Slices) | | -- returns a set Slices consist of SDG slice nodes |

The Algorithm 1 takes SDG of the application and SQL hotspot criterion as inputs. It then computes backward slices for the criterion collected in the criteria list, at 204. For each criteria in the criteria list, it executes an existing slicing algorithm (lines 7-31) to generate the backward slice. Each backward slice is collected in the slices set (line 36). While computing a backward slice, the algorithm collects string generation criterion at lines 18-20. Typically, in Java, toString( ) method of user defined class or java.lang.Object class is invoked on the receiver object to generate string. Algorithm 1 collects only those string generation nodes which are invoked on chosen Java String construction APIs and puts them in the criteria list (lines 18-20).

Algorithm 2 further processes the backward slices computed by Algorithm 1 and extracts SQL queries.

Algorithm 2: Function extractSQLQuery(Slices)

Slices: The set of slices computed through function computeMultiCriteriaMultipleBackwardSlices

```
    a)  constantMap                         -- Value of each constant variable
    b)  stringOprVariables                  -- String operation variables
    c)  sqlQuery                            -- Extracted SQL query
    d)  fwdSlice                            -- forward slice computed for constant variables
    e)  METHOD_CALL                         -- Node type is call to a function
    f)  ASSIGNMENT                          -- Node type is assignment
    g)  CONSTANT                            -- Assignment type node's right operand is
                                               constant
1.  for each slice in Slices do {
2.      constantMap = empty
3.      stringOprVariables = empty
4.      sqlQuery = null
5.      for each node, n in slice do {
6.          if n type is ASSIGNMENT then
7.          if n right operand is CONSTANT then
8.              constantMap.put(n.leftOperand( ),          -- put assignment node
9.              n.rightOperand( ).value( ))                left and right operand
10.                                                   into constantMap
11.         else
12.             constantMap.put(n.leftOperand, "Undef"  -- put node left operand
                                                           and a value "Undef" into
                                                           constantMap
13.         if n type is ASSIGNMENT and n.leftOperand( ) is
                not equal to "Undef" then
14.             fwdSlice = computeForwardSlice(n)       -- compute the forward
                                                           slice for each constant
                                                           variable
15.             classify(fwdSlice)                      -- edges collected during
                                                           forward slice are classified
                                                           into NF & HF as described
                                                        in paragraph[43]
16.             propagate(fwdSlice, constantMap)        -- each variable value is
                                                        computed along the classi-
                                                        fied edges by propagating
                                                        the constantMap values
17.         if n type is METHOD_CALL then
18.         if n class is java.lang.String and method is valueOf then
19.             stringOprVariables.put(n.leftOperand( ))    -- put method call node left
20.             stringOprVariables.put(n.getMethodParameters( ))  operand & method paramet-
                                                            ers into stringOprVariables
21.         if n class is StringBuilder then
22.         if n method is append or toString( ) then
23.             stringOprVariables.put(n.leftOperand( ))
                                                        -- put node left operand into
                                                        stringOprVariables
24.         if n method is append then
25.             stringOprVariables.put(n.getMethodParameters( ))  -- put method parameters
                                                        into stringOprVariables
26.         if n method is constructor then
27.             stringOprVariables.put(n.getReceiver( ))    -- put receiver into
                                                        stringOprVariables
28.     }
29.     for each value in stringOprVariables do{
30.         value = getValue(n, constantMap)            -- get values of each string
                                                        operation variables from
                                                        constantMap
31.         sqlQuery.append(value)                      -- populate the values com-
                                                        puted for variables in SQL query
32.     }
33. }
34. return (sqlQuery)                                   -- return extracted SQL query
```

To extract the SQL query, constant variables (those are assigned actual values in an application itself) need to be processed and their values should be propagated.

The method at 210 processes each of the one or more backward slices corresponding to the one or more query generation nodes to extract one or more SQL queries. In an embodiment, processing each of the one or more backward slices includes classifying one or more edges associated with the one or more backward slices in the SDG and propagating values of one or more constant variables in the application along the one or more edges Algorithm 2 propagates constant values by computing a forward slice bound by the string generation criterion for each constant variable. While computing a forward slice, Algorithm 2 traverses parameter-in, data, and parameter-out edges of SDG. Algorithm 2 first collects constant variables in the constant map (lines 6-12). If a variable is not directly assigned constant value, algorithm puts "Undef" value against that variable.

Algorithm 2 computes a forward slice (line 14) for each constant variable collected in constant map to correctly estimate the values of variables used in query generation nodes (lines 19-20, 23, 25, 27). Algorithm collects edges of SDG in the forward slice. Each collected edge is classified into Normal Flow (NF) and Heap Flow (HF). NF edge is a data edge which includes nodes with operations on variables of primitive data type. Every HF edge is further classified into one of HeapCopy, HeapFieldRead, HeapFieldWrite, and HeapAbstraction. The rules for classification of a HF edge are as follow:—

If source node and destination node of an edge are instance variables, it is marked as HeapCopy.

If destination node of edge represents assignment to a variable from the field of instance variable and source node represents either definition of instance variable or the field being assigned then, it is marked as HeapFieldRead.

If destination node of edge represents assignment to the field of instance variable and source node represents the definition of variable getting assigned then, it is marked as HeapFieldWrite.

HeapAbstraction is a data edge created while constructing SDG between a node representing write operation to the field of an instance variable and instance variable.

The edges HeapCopy, HeapFieldRead, HeapFieldWrite, and HeapAbstraction are illustrated with respect to FIG. 3. As shown in FIG. 3, few edges are marked according to the above mention set of rules. Data edge in the PDG of Employee constructor (init method) between this node and this.name=name node is marked with HeapFieldWrite. Parameterout edge between this formal-out node of Employee constructor and e2 actual-out node is marked with HeapCopy. A data edge between this.name=name node and formal-out node this of Employee constructor is marked with HeapAbstraction. Data edge between this node and return node of getName method is marked with HeapFieldRead.

Once edges are classified, values of the one or more constant variables in the application are computed along the classified edges. The data edges in SDG are computed using def-use chains. Therefore, propagation along NF edges amounts to assigning values to variables based on the values computed at source node of NF edge. Since algorithms operate on Jimple IR which is three addressed IR form therefore, at most two data edges could be incident on the given SDG node excluding method invocation node where the number of data edges on the method invocation node is determined based on the number of parameter nodes. Heap-Copy edge does not compute new values for any field of instance variable rather creates a new definition of instance variable with same values. HeapAbstraction edge creates an explicit data dependency between a node representing field write operation with the node representing heap object. It indirectly captures a new value flowing into one of fields in a given heap object. HeapFieldRead edge assigns a value to variable from the field of an instance variable. HeapFieldWrite edges assigns a new value to the field of an instance variable.

Herein, Algorithm 2 computes forward slice for each constant variable and hence the final values of variables cannot be determined unless forward slices for all constant variables are processed. If value of some variable cannot be determined using all slices of constant variables (e.g., variable gets value from a database or a file), it is marked as undefined.

Finally, SQL query is extracted by propagating the values of variables in the methods of Java string API classes in the backward slice computed by Algorithm 1. In the absence of Java String API classes (Java library is not included in SDG generation), execution semantics of methods of such classes can be modeled and SQL query can be generated. Herein, it will be noted that modeling of execution semantics of operators (e.g., arithmetic, logical, etc.) is unavoidable to get the value of a variable during propagation of values.

The SQL queries extracted using the disclosed method and system are checked for its syntax validity by using one of a SQL parser. The reason for checking the syntactic validity is to remove invalid queries (if any) generated by the disclosed method and system. Since the content of queries are specific to databases, it is natural that the extracted queries should be executed against specific database to check its syntax validity. In an embodiment, a SQL parser may be utilized to validate extracted SQL queries.

An example of backward slice is presented in Listing 2. Listing 2 is the backward slice on the IR for the criterion of line 10 (of Listing 1), first SQL generation point.

| Listing 2 |
| --- |
| 1    . . |
| 2    t = new Employee |
| 3    t . < init > ( " John " , . . ) |
| 4    e1 = t |
| 5    q1Frag = " SELECT * FROM EMPLOYEE" |
| 6    . . |
| 7    tmp = e1.getName ( ) ; |
| 8    q2Frag = tmp |
| 9    . . |
| 10    if flag < 11 goto < lineno > |
| 11    . . |
| 12    q1Frag2 = invoke < java.lang.String |
| 13    valueOf (java.lang.Object) >(q1Frag) |
| 14    . . |
| 15    invoke qBuilder . < void < init > |
| 16    (java.lang.String) >(q1Frag2) |
| 17    . . |
| 18    sqlQuery = invoke qBuilder. < java.lang.StringBuilder |
| 19    append (java.lang.String) >(q2Frag) |
| 20    . . |
| 21    result = invoke sqlQuery . < java.lang.String |
| 22    toString ( ) > ( ) |

Node containing invoke keyword represents a call to method. As discussed, Algorithm 2 collects constant variable q1Frag and its value and puts it in the map. It also puts constant actual parameter "John", actual-in parameter for constructor of Employee class for e1 instance, in the map. For non-constant variable q2Frag, "Undef" value is put.

Subsequently, Algorithm 2 computes two forward slices for q1Frag variable and constant actual-in parameter up to SDG node encoding expression to String method (line 21-22 in Listing 2). The value of q2Frag is estimated by first classifying edges collect in the forward slice for actual-in parameter and then propagating its value along those edges. As shown in FIG. 3, the following edges between SDG nodes are captured and classified: {"John"→name, name→this.name=name, this.name→this, this→e1, e1 (of init method)→e1 (of getName), e1→this, this→return this-.name, return this.name→name, name→e1.name}. The return value from getName method is assigned to q2Frag through tmp variable.

An example scenario illustrating experimental results for extraction of SQL queries is described in the description below.

Example Scenario:

Referring to the description below, an example scenario illustrating experimental results for SQL queries extraction for an application is presented.

To establish confidence and measure the quality of the proposed system, evaluation of ground truth is significant. Ground truth was prepared manually by analyzing a few open-source web applications. For instance, as shown in Table-1, GOAD, AltoroJ, Lutece-core-master, and JSA are open source web applications of 1406, 3089, 146526 and 1775 lines of code respectively. In addition to manual analysis of the aforementioned applications, every SQL query that existed in the application was explicitly constructed. Measuring the precision and recall in the presence of ground truth helped to evaluate the disclosed system accurately.

Precision and recall are two extremely important system evaluation metrics. While precision refers to the percentage of the relevant results computed by our system, recall refers to the percentage of total relevant results correctly computed by the proposed system. Our computation of precision and recall are as follows:

$$\text{Precision} = \frac{\text{Total number of extracted } SQL \text{ queries that are relevant}}{\text{Total number of } SQL \text{ queries that are retrieved}}$$

$$\text{Recall} = \frac{\text{Total number of } SQL \text{ queries that are relevant}}{\text{Total number of relevant } SQL \text{ query exist in the application}}$$

Moreover, the disclosed method was compared with a popular approach JSA. The comparison between the JSA tool and the disclosed method on the JSA benchmark is shown in Table 2.

TABLE 1

Precision and Recall of Multi-criteria algorithm for a few open source web application and JSA benchmarks

| Application Name | Precision | Recall |
|---|---|---|
| OOAD | 100 | 100 |
| Lutece-core-master | 93.90 | 93.90 |
| AltoroJ | 92.85 | 92.85 |
| JSA Benchmark | 100 | 100 |

TABLE 2

Precision and Recall Comparison for JSA benchmark

| Approach | Precision | Recall |
|---|---|---|
| Java ™ String Analyzer (JSA) | 50 | 50 |
| Multi-Criteria Algorithm | 87.3 | 87.03 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system for handing SQL queries in an application. In an embodiment, the disclosed method and system utilizes a multi-criteria backward slicing model/algorithm to extract SQL queries at SQL generation points in Java™ based applications. The disclosed multi-criteria backward slicing model/algorithm accounts for heap based data flow at SQL generation point by augmenting SDG of an application with heap object model. The disclosed method and system are able to achieve very high precision and recall in many applications of both benchmarks The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for extracting a structured query language (SQL) query in an application, the method comprising:

obtaining (202), via one or more hardware processors, a System Dependence Graph (SDG) of the application and a slicing criterion associated with a SQL hotspot, the SQL hotspot comprising a program point in the application for dispatching the SQL query to a database associated with the application;

extracting (204), via the one or more hardware processors, one or more query generation nodes of the SQL query from the application;

computing (206), based on the slicing criterion, a main backward slice for the SQL hotspot using a backward slicing model, via the one or more hardware processors;

computing (208), via the one or more hardware processors, one or more backward slices on the main backward slice extracted for the SQL hotspot by using each of the one or more query generation nodes as new slicing criterion;

processing (210), via the one or more hardware processors, each of the one or more backward slices corresponding to the one or more query generation nodes to extract one or more SQL queries, wherein processing comprises classifying one or more edges associated with the one or more backward slices in the SDG and propagating values of one or more constant variables in the application along the one or more edges and computing a string generation criterion while computing the one or more backward slices, wherein processing further comprises computing a forward slice bound by the string generation criterion for each of one or more constant variable, further wherein while computing the forward slice, traversing parameter-in, data, and parameter-out edges of the SDG and wherein classifying comprises:

collecting a plurality of SDG edges in a forward slice; and
classifying each of plurality of SDG edges into one of a Normal Flow (NF) edge and a Heap Flow (HF) edge, wherein an NF edge comprises a data edge comprising nodes with operations on variables of primitive data type, further comprising classifying each of the HF edge from amongst the plurality of SDG edges into one of HeapCopy, HeapFieldRead, HeapFieldWrite, and HeapAbstraction based on a plurality of predefined HF edge classification rules; and
checking (212), via the one or more hardware processors, each of the one or more SQL queries for syntactic validity by using a SQL parser.

2. The processor implemented method of claim 1, further comprising computing a plurality of program dependence graphs (PDGs) for the application, wherein a PDG of the plurality of PDGs represent a method of the application, the PDG comprises a plurality of PDG nodes and a plurality PDG edges, wherein each PDG edge of the plurality of PDG edges connects a node pair of the plurality of PDG nodes, further wherein each PDG node of the plurality of PDG nodes represent a program statement of Intermediate Representation (IR) of a method and structure of node pair depends on a selection of IR and program analysis framework, further wherein each PDG edge of the plurality of PDG edges comprises one of a control edge and a data edge, the control edge between two PDG nodes indicates control dependency, and a data edge between two PDG nodes indicates the data dependency.

3. The processor implemented method of claim 2, further comprising computing the SDG graph representative of the application, computing the SDG graph comprises combining the plurality of PDG graphs, wherein two PDGs are connected through a call edge that captures method invocation semantics of a programming language, each PDG comprises an entry node and an exit node connected through a control edge, a call edge between a callsite node and an entry node of the PDG.

4. The processor implemented method of claim 1, further comprises collecting the one or more backward slices in a slice set.

5. The processor implemented method of claim 1, wherein the HeapCopy comprises of an edge when a source node and a destination node of the edge are instance variables,
further wherein the HeapFieldRead comprises of an edge if the destination node of the edge represents assignment to a variable from the field of instance variable and
the source node represents one of definition of instance variable and the field being assigned, further wherein the HeapFieldWrite comprises of an edge if the destination node of the edge represents assignment to the field of instance variable and the source node represents the definition of variable getting assigned, and
further wherein HeapAbstraction comprises of a data edge created while constructing SDG between a node representing write operation to the field of an instance variable and instance variable.

6. The processor implemented method of claim 1, wherein propagation along the NF edges comprises assigning values to variables based on the values computed at source node of each of the NF edge.

7. A system (100) for extracting structured query language (SQL) queries in an application, comprising:
one or more memories (106); and
one or more hardware processors (102), the one or more memories (106) coupled to the one or more hardware processors (102), wherein the one or more hardware processors (102) are configured to execute programmed instructions stored in the one or more memories (106), to:
obtain a System Dependence Graph (SDG) of the application and a slicing criterion associated with a SQL hotspot, the SQL hotspot comprising a program point in the application for dispatching the SQL query to a database associated with the application;
extracting, via the one or more hardware processors, one or more query generation nodes of the SQL query from the application;
compute, based on the slicing criterion, a main backward slice for the SQL hotspot using a backward slicing model;
compute one or more backward slices on the main backward slice extracted for the SQL hotspot by using each of the one or more query generation nodes as new slicing criterion;
process each of the one or more backward slices corresponding to the one or more query generation nodes to extract one or more SQL queries, wherein processing comprises classifying one or more edges associated with the one or more backward slices in the SDG and propagating values of one or more constant variables in the application along the one or more edges wherein the one or more hardware processors are further configured by the instructions to compute a string generation criterion while computing the one or more backward slices, wherein to process the one or more hardware processors are further configured by the instructions to compute a forward slice bound by the string generation criterion for each of one or more constant variable, further wherein while computing the forward slice, the one or more hardware processors are configured to traverse parameter-in, data, and parameter-out edges of the SDG and wherein to classify, the one or more hardware processors are further configured by the instructions to:
collect a plurality of SDG edges in a forward slice; and
classify each of plurality of SDG edges into one of a Normal Flow (NF) edge and a Heap Flow (HF) edge, wherein an NF edge comprises a data edge comprising nodes with operations on variables of primitive data type, further comprising classifying each of the HF edge from amongst the plurality of SDG edges into one of HeapCopy, HeapFieldRead, HeapFieldWrite, and HeapAbstraction based on a plurality of predefined HF edge classification rules; and
check each of the one or more SQL queries for syntactic validity by using a SQL parser.

8. The system of claim 7, wherein the one or more hardware processors are further configured by the instructions to compute a plurality of program dependence graphs (PDGs) for the application, wherein a PDG of the plurality of PDGs represent a method of the application, the PDG comprises a plurality of PDG nodes and a plurality PDG edges, wherein each PDG edge of the plurality of PDG edges connects a node pair of the plurality of PDG nodes, further wherein each PDG node of the plurality of PDG nodes represent a program statement of Intermediate Representation (IR) of a method and structure of node pair depends on a selection of IR and program analysis framework, further wherein each PDG edge of the plurality of PDG edges comprises one of a control edge and a data edge, the control edge between two PDG nodes indicates control dependency, and a data edge between two PDG nodes indicates the data dependency.

9. The system of claim 8, wherein the one or more hardware processors are further configured by the instructions to compute the SDG graph representative of the application, computing the SDG graph comprises combining the plurality of PDG graphs, wherein two PDGs are connected through a call edge that captures method invocation semantics of a programming language, each PDG comprises an entry node and an exit node connected through a control edge, a call edge between a callsite node and an entry node of the PDG.

10. The system of claim 7, wherein the one or more hardware processors are further configured by the instructions to collect the one or more backward slices in a slice set.

11. The system of claim 7, wherein the HeapCopy comprises of an edge when a source node and a destination node of the edge are instance variables,
   further wherein the HeapFieldRead comprises of an edge if the destination node of the edge represents assignment to a variable from the field of instance variable and the source node represents one of definition of instance variable and the field being assigned,
   further wherein the HeapFieldWrite comprises of an edge if the destination node of the edge represents assignment to the field of instance variable and the source node represents the definition of variable getting assigned, and
   further wherein HeapAbstraction comprises of a data edge created while constructing SDG between a node representing write operation to the field of an instance variable and instance variable.

12. The system of claim 7, wherein propagation along the NF edges comprises assigning values to variables based on the values computed at source node of each of the NF edge.

13. One or more non-transitory machine readable information storage mediums comprising one or more instructions which when executed by one or more hardware processors cause:
   obtaining (202), via one or more hardware processors, a System Dependence Graph (SDG) of the application and a slicing criterion associated with a SQL hotspot, the SQL hotspot comprising a program point in the application for dispatching the SQL query to a database associated with the application;
   extracting (204), via the one or more hardware processors, one or more query generation nodes of the SQL query from the application;
   computing (206), based on the slicing criterion, a main backward slice for the SQL hotspot using a backward slicing model, via the one or more hardware processors;
   computing (208), via the one or more hardware processors, one or more backward slices on the main backward slice extracted for the SQL hotspot by using each of the one or more query generation nodes as new slicing criterion;
   processing (210), via the one or more hardware processors, each of the one or more backward slices corresponding to the one or more query generation nodes to extract one or more SQL queries, wherein processing comprises classifying one or more edges associated with the one or more backward slices in the SDG and propagating values of one or more constant variables in the application along the one or more edges; and
   checking (212), via the one or more hardware processors, each of the one or more SQL queries for syntactic validity by using a SQL parser and computing a string generation criterion while computing the one or more backward slices, wherein processing further comprises computing a forward slice bound by the string generation criterion for each of one or more constant variable, further wherein while computing the forward slice, traversing parameter-in, data, and parameter-out edges of the SDG and wherein classifying comprises:
   collecting a plurality of SDG edges in a forward slice; and
   classifying each of plurality of SDG edges into one of a Normal Flow (NF) edge and a Heap Flow (HF) edge, wherein an NF edge comprises a data edge comprising nodes with operations on variables of primitive data type, further comprising classifying each of the HF edge from amongst the plurality of SDG edges into one of HeapCopy, HeapFieldRead, HeapFieldWrite, and HeapAbstraction based on a plurality of predefined HF edge classification rules.

* * * * *